United States Patent
Lumezanu et al.

(10) Patent No.: US 11,620,518 B2
(45) Date of Patent: Apr. 4, 2023

(54) LANDMARK-BASED CLASSIFICATION MODEL UPDATING

(71) Applicant: NEC Laboratories America, Inc., Princeton, NJ (US)

(72) Inventors: Cristian Lumezanu, Princeton Junction, NJ (US); Haifeng Chen, West Windsor, NJ (US); Dongjin Song, Princeton, NJ (US); Wei Cheng, Princeton Junction, NJ (US); Takehiko Mizoguchi, Princeton, NJ (US); Xiaoyuan Liang, Kearny, NJ (US); Yuncong Chen, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 401 days.

(21) Appl. No.: 16/866,885

(22) Filed: May 5, 2020

(65) Prior Publication Data

US 2020/0364563 A1 Nov. 19, 2020

Related U.S. Application Data

(60) Provisional application No. 62/893,359, filed on Aug. 29, 2019, provisional application No. 62/846,816, filed on May 13, 2019.

(51) Int. Cl.
*G06N 3/08* (2006.01)
*G06K 9/62* (2022.01)

(52) U.S. Cl.
CPC ............ *G06N 3/08* (2013.01); *G06K 9/6257* (2013.01)

(58) Field of Classification Search
CPC .............................. G06N 3/08; G06K 9/6257
See application file for complete search history.

(56) References Cited

U.S. PATENT DOCUMENTS

| 2011/0161267 | A1 | 6/2011 | Chowdhary et al. |
| 2014/0025354 | A1 | 1/2014 | Padullaparthi et al. |
| 2021/0365114 | A1* | 11/2021 | Hewage .................. G06F 3/015 |

OTHER PUBLICATIONS

Pan, Sinno Jianlin, et al., "A survey on transfer learning." IEEE Transactions on knowledge and data engineering, Oct. 2009, pp. 1345-1359, 22.10.

Sprint, Gina, et al., "Analyzing sensor-based time series data to track changes in physical activity during inpatient rehabilitation," Sensors, Oct. 2017, 20 pages, 17.10.

Jolliffe, I.T., "Principal component analysis for time series and other non-independent data," Principal Component Analysis, 2nd edition, 2002, pp. 229-337.

(Continued)

*Primary Examiner* — Antonio A Caschera
(74) *Attorney, Agent, or Firm* — Joseph Kolodka

(57) ABSTRACT

Systems and methods for updating a classification model of a neural network. The methods include selecting, as a set of landmarks, a limited number of data from a set of historical data used to train a classification model. Additionally, the methods generate new training data from recently collected data. Further, the methods update the classification model with the new training data and the set of landmarks to obtain an updated classification model having a loss function configured to capture similarities in the new training data and remember similarities in the historical data represented by the set of landmarks within a predefined tolerance.

20 Claims, 7 Drawing Sheets

(56) References Cited

OTHER PUBLICATIONS

Baktashmotlagh, Mahsa, et al., "Unsupervised domain adaptation by domain invariant projection." Proceedings of the IEEE International Conference on Computer Vision, Dec. 2013, pp. 769-776.

Song, Dongjin, et al., "Deep r-th root of rank supervised joint binary embedding for multivariate time series retrieval," Proceedings of the 24th ACM SIGKDD International Conference on Knowledge Discovery & Data Mining, Jul. 2018, pp. 2229-2238.

Sutskever, Iiya, et al., "Sequence to sequence learning with neural networks," Advances in neural information processing systems, Dec. 2014, pp. 3104-3112.

Cortes, Corinna, et al., "Domain adaptation and sample bias correction theory and algorithm for regression," Theoretical Computer Science, Jan. 2014, pp. 103-126, 519.

Cortes, Corinna, et al., "Learning bounds for importance weighting," Advances in neural information processing systems, Dec. 2010, pp. 442-450.

Fawaz, Hassan Ismail, et al., "Deep learning for time series classification: a review," Data Mining and Knowledge Discovery, Jul. 2019, pp. 917-963, 33.4.

Kouw, Wouter M., et al., "An introduction to domain adaptation and transfer learning," arXiv preprint arXiv, Dec. 2018, 42 pages, 1812.11806.

Fridman, Lex, et al., "MIT advanced vehicle technology study: Large-scale naturalistic driving study of driver behavior and interaction with automation," IEEE Access, Jul. 2019, pp. 102021-102038, 7.

Qin, Yao, et al., "A dual-stage attention-based recurrent neural network for time series prediction," arXiv preprint arXiv, Apr. 2017, 7 pages, 1704.02971.

Shipmon, Dominique T., et al., "Time series anomaly detection; detection of anomalous drops with limited features and sparse examples in noisy highly periodic data," arXiv preprint arXiv, Aug. 2017, 9 pages, 1708.03665.

Rebuffi, Sylvestre-Alvise, et al., "icarl: Incremental classifier and representation learning," Proceedings of the IEEE conference on Computer Vision and Pattern Recognition, Jul. 2017, pp. 2001-2010.

Gopalan, Raghuraman, et al., "Domain adaptation for visual recognition," Foundations and Trends® in Computer Graphics and Vision, Mar. 2015, pp. 285-378, 8.4.

Cho, Kyunghyun, et al., "Learning phrase representations using RNN encoder-decoder for statistical machine translation," arXiv preprint arXiv, Jun. 2014, 15 pages, 1406.1078.

\* cited by examiner

LANDMARK-BASED CLASSIFICATION MODEL UPDATING

RELATED APPLICATION INFORMATION

This application claims priority to U.S. Provisional Application No. 62/846,816 filed on May 13, 2019, incorporated herein by reference herein its entirety, and to Provisional Application No. 62/893,359 filed on Aug. 29, 2019, incorporated herein by reference herein its entirety.

BACKGROUND

Technical Field

The present invention relates to multivariate time series classification models and more particularly to systems and methods for updating multivariate time series classification models using landmarks.

Description of the Related Art

Models trained on historical time series data are often used to classify time series data. As time series data accumulates, the mapping between the raw data and the embedding space (e.g., classifications) can become outdated. Consequently, the model may require periodic retraining or updating to reflect all of the old data as well as the newly collected data. However, as the amount of old data increases, the retraining process can soon become resource intensive and impractical.

SUMMARY

According to an aspect of the present invention, a computer-implemented method for updating a classification model of a neural network is provided. The method includes selecting, as a set of landmarks, a limited number of data from a set of historical data used to train a classification model. Additionally, the method generates new training data from recently collected data. Further, the method updates the classification model with the new training data and the set of landmarks to obtain an updated classification model having a loss function configured to capture similarities in the new training data and remember similarities in the historical data represented by the set of landmarks within a predefined tolerance.

According to another aspect of the present invention, a neural network system is provided. The neural network system includes a non-transitory computer readable storage medium embodying computer readable instructions; and a processor device configured to implement a classification model based on the computer readable instructions. The processor device updates the classification model by implementing a selection module configured to select, as a set of landmarks, a limited number of data from a set of historical data used to train the classification model; and a model updating module configured to update the classification model with new training data and the set of landmarks to obtain an updated classification model having a loss function configured to capture similarities in the new training data and remember similarities in the historical data represented by the set of landmarks within a predefined tolerance.

According to yet another aspect of the present invention, a non-transitory computer readable storage medium comprising a computer readable program for updating a classification model of a neural network is provided. The computer readable program when executed on a computer causes the computer to select, as a set of landmarks, a limited number of data from a set of historical data used to train a classification model. Additionally, the computer generates new training data from recently collected data. Furthermore, the computer updates the classification model with the new training data to obtain an updated classification model having a loss function configured to capture similarities in the new training data and remember similarities in the historical data represented by the set of landmarks within a predefined tolerance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
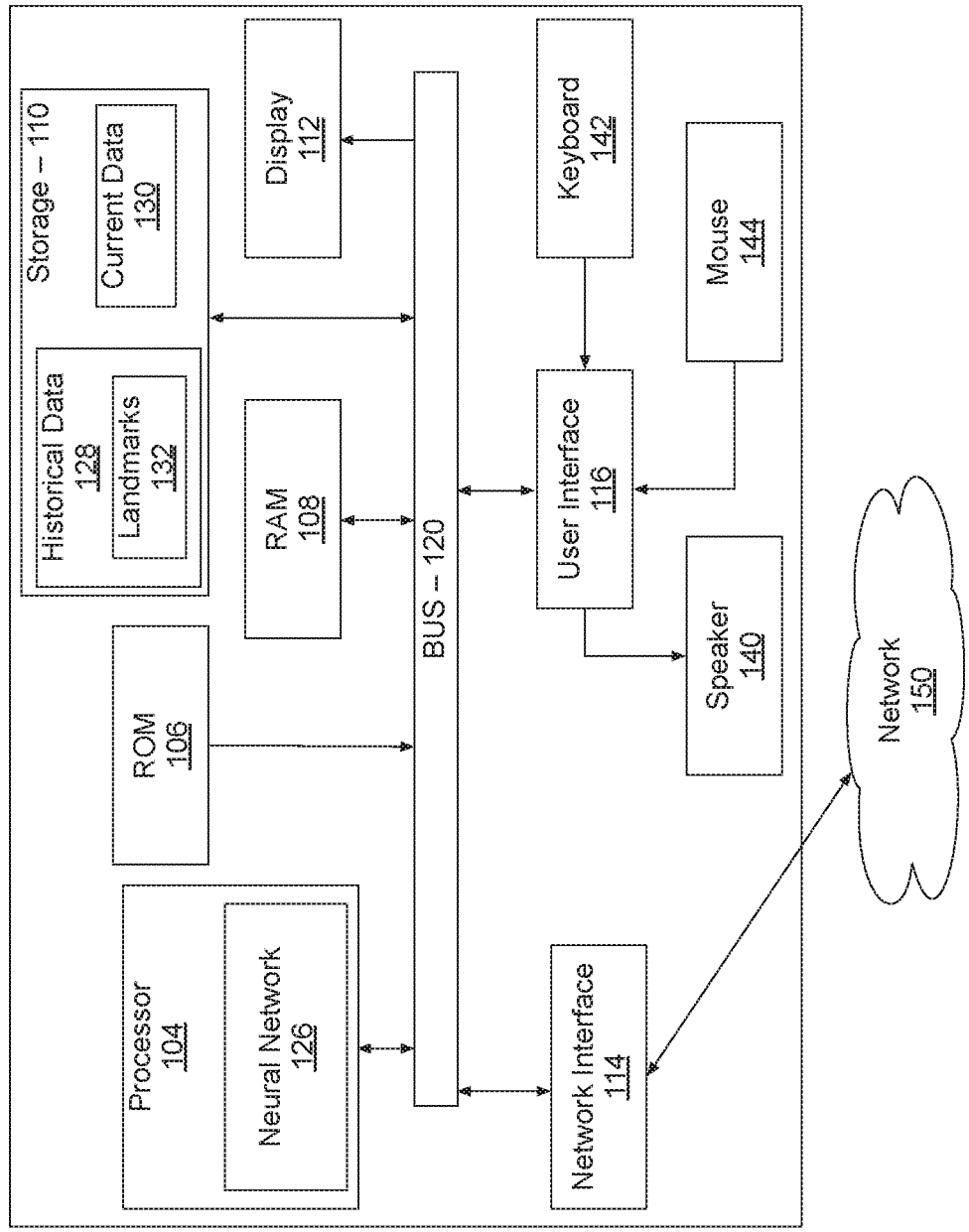
FIG. 1 is a block representation of a system for updating a classification model using landmarks, in accordance with an embodiment of the present invention.

Classification models are used in a wide range of machine learning environments, such as object/facial recognition, healthcare, and powerplant monitoring, for example. Classification models attempt to match current time series data, such as, for example data generated by sensors, with representations of similar data that has been previously identified (e.g., historical data). However, over time the learned mapping (e.g., embeddings) between current time-series data and the representation of the historical data becomes outdated, such that the classification of the current data becomes less accurate. This is in general a function of the sensor operating parameters changing over time. For example, training a model to classify whether a person is walking or running based on heartbeat and GPS data would have little accuracy in detecting when the same person is climbing stairs, as the values of the sensors change when compared to the data used to train the model.

To remedy this situation, periodic updating of the model can be performed to include the time series data collected up to the point of the update, both historical data originally used to train the classification model and more recently acquired data. By using the historical data in the update, the updated classification model retains, or remembers, the historical mappings, while the recently acquired data allows the updated classification model to accurately recognize the current time-series data. However, this approach can encounter several issues that make the updating impractical or unsuccessful. For example, over time the pool of historical data can become very large, thus causing the update to become too resource intensive. Alternatively, oftentimes all the historical data is not readily available for performing an update. For example, particularly old historical data may have been archived or deleted, and thus, not available as training data during the update process. Accordingly, as the historical data becomes a diminishing portion of the training data, replaced instead by current data, the updated model becomes less able to properly remember the historical data.

Embodiments of the present invention provide systems and methods that can update a model using a limited amount of historical data, referred to herein as landmarks, in combination with recently collected data (e.g., current data) to retrain the classification model. In one embodiment, the retrained classification model can have a total loss function optimized (to within a predefined tolerance) to learn the new data as well as remember the old (historical) data represented by the landmarks. The number of landmarks used can be limited to an amount significantly less than the total historical data used to previously train or update the classification model. The landmarks can be carefully selected to provide a balanced representation of the historical data. Thus, in some embodiments, a distance-based, smart selection process can be implemented to select the landmarks. Other landmark selection methods that provide a balanced representation of the historical data can be utilized as well. Since the number of landmarks used is significantly less than the quantity of historical data, embodiments of the present invention can update the classification model even when only a small subset of the total historical data is available from which to select the landmarks. Moreover, the reduced amount of historical data, in the form of landmarks, being used during the update process can expedite the retraining of the classification model.

FIG. 1 shows a system 100 configured, according to an embodiment of the present invention, to implement a classification model updated using landmarks. The system 100 includes a processor 104, such as, a central processing unit (CPU), a graphical processing unit (GPU), a configured field programmable gate array (FPGA), an application specific integrated circuit (ASIC), or a combination of these, for example. In some embodiments, the processor 104 implements the functionality of a neural network 126, forming a classification model, for example.

The processor 104 is in communication, via a system bus 120, with memory devices, such as random-access memory (RAM) 106, and read-only memory (ROM) 108. The system bus 120 is also coupled to one or more mass storage devices 110, such as, for example, hard drives, solid state drives, etc. A display 112, user interface controller 116 and network interface 114 are also coupled to the system bus 120. The user interface controller 116 provides an interface between the system 100 and a user by way of various human interface devices (HID) such as, for example, keyboard 142, mouse 144, speakers 140, etc. The network interface 114 transmits and receives data communication between the system 100 and external devices, such as one or more sensors, via a network 150. However, in some embodiments, sensors that generated time-series data can be directly connected to the system 100 by way of a serial connection or other communication interface. The storage device 110 includes historical data 128 (including landmarks 132) and current data 130.

The historical data 128 and the current data 130 can, in some embodiments, be stored in one or more databases. In other embodiments, the historical data 128 and the current data 130 can be stored in a plurality of flat files.

The network 150 can be a local area network (LAN), wide area network (WAN), Internet, or a combination of these. Additionally, the network 150 can be configured using any of the IEEE 802 family of networking protocols, for example, such as Ethernet (IEEE 802.3), Wireless LAN (IEEE 802.11), etc. and transmit data using, for example, Transmission Control Protocol (TCP), User Datagram Protocol (UDP), etc.

In some embodiments, the historical data 128 and the current data 130 are gathered using essentially the same sensors, which can be image sensors, microphones, flowmeters, or any other sensor that provides a time series data output, and labels. However, in embodiments where the sensors and labels may have changed, further mappings can be implemented to associate the sensor characteristics and labels with their original counterparts.

Some embodiments can use the landmarks 132 (e.g., a subset of the historical data 128) and current data 130 to generate a single mapping function encompassing the various operational phases of the updated classification model 126. Other embodiments can generate individual mapping functions for each operational phase of the classification process. However, maintaining multiple mapping functions can be inefficient.

Some embodiments can be configured to update mappings of a classification model 126 with limited access to historical data 128, and without knowledge of any properties of the current data 130 nor how the current data 130 differs from the historical data 128.

In an embodiment, a classification model 126 can learn embeddings using a long short-term memory (LSTM)-based recurrent neural network whose input can be short time windows overlapping over a set of historical data 128. An optimal representation can be found by reducing a triplet loss at each epoch of learning. To update the time series representations, the previously trained network can be updated using the current data 130 to reduce the loss (as expressed by a loss function) on new data. Knowledge of the historical data 128 can be remembered by selecting landmarks 132 from the historical data 128 for use as training samples. These landmarks 132 can represent the historical data 128 and constrain the training into remembering the knowledge from the historical data 128. The remembering constraint is expressed in the loss function by a new component, referred to herein as a landmark loss.

Some embodiments of the present invention treat the mapping as dynamic, thus, the mapping learned on historical data 128 may not be valid on some new data. Accordingly, algorithms are developed to adapt the learned mapping (or model) when faced with new, different data.

For example, when the input data is formed of n streaming time series, where each individual series contains a series of readings across time. Herein, the letter S (for source) is used to denote the historical data 128, and T (for target) is used to denote the new, or current data 130. Consequently, the historical data 128 ($X_S$) includes a series of readings, or data points, ($x^1, x^2, \ldots, x^n$).

For classification models 126, a mapping can be learned between S and a Euclidean space R of dimension d using any recurrent neural network-based architecture, such as long short-term memory (LSTM), for example. Over time the classification model 126 can become less able to properly classify new data having a domain T whose distribution is different from the historical data 128 domain S, the classification models 126 in some embodiments can be configured to learn a new mapping from both the historical data 128 S and the new data 130 T that preserves the representations of the historical data 128 S. Thus, domain update free representations can be generated to save space and computation while preserving accuracy.

The updated mapping $f_T$, in which the new data 130 ($X_T$) is mapped to $R^d$, can be selected so that the updated mapping $f_T$ for new data 130 ($X_T$) and the historical mapping of the historical data 128 equals a group of vectors $p^1$, $p^2$, $p^3$ ..., $p^d$ in the Euclidean space $R^d$ The updated mapping $f_T$ can be trained such that mapping $f_T$ minimizes a loss function, such as, for example a total loss function represented as:

$$\text{total}_l = \text{landmark}_{loss} + \text{newdata}_{loss} \quad \text{(Eq. 1)}$$

The landmark$_{loss}$ for a data point (e.g., landmark) is the Euclidean distance d (e.g., similarity) between the representation of the data point in the historical mapping $f_S(X)$ and the new mapping $f_T(X)$. The landmark loss can be expressed as:

$$\text{landmark}_{loss}(X) = d(f_S(X), f_T(X)) \quad \text{(Eq. 2)}$$

where the newdata$_{loss}$ can be the same loss function used when training the original mapping. One appropriate option for the loss function can be a triplet loss.

Thus, in some embodiments, the total loss to be minimized can be expressed as:

$$\text{total}_1(X_T, X_S) = \frac{1}{m}\Sigma_{i=1}^m [d(f_T(x_i), f_T(x_j))^2 - d(f_T(x_i), f_T(x_k))^2] + \quad \text{(Eq. 3)}$$
$$\frac{1}{n}\Sigma_{l=1}^n d(f_S(x_1), f_T(x_1))$$

where $X_T$ denotes target data (e.g., current data 130), and $X_S$ denotes source data (e.g., historical data 128). Hence, $x_i$, $x_j$, $x_k$ are data segments of the target data $X_T$, $x_1$ is a data segment of the source data $X_S$, and m is the number of landmarks 132 used in the update.

In some embodiments, a new mapping function for both the historical data 128 (represented by the landmarks 132) and the new data 130 can correctly capture the properties of the new data 130, and remember the properties of the historical data 128. To satisfy these criteria, the new mapping can be learned using the novel total loss function of Eq. 1. One technique for optimizing the learning of the new data 130, in some embodiments, can include applying a same loss function as previously used during the learning of the historical data 128 by the classification model 126. For example, a triplet loss function used to train the original classification model 126 ($F_A$) on the historical data 128 can be used on the new data 130 as well. One such triplet loss function can be expressed as:

$$L_{triplet} = \max^2(|F_A(a) - F_A(p)| - \|F_A(a) - F_A(n)\| + \alpha, 0) \quad \text{(Eq. 4)}$$

where a, p, and n are elements of $X_T$, such that a and p have the same label and a and n have different labels.

Herein, the terms "minimize" and "optimize", with respect to the present invention, should be understood to refer to minimizing or optimizing, the loss function, for example, within a predefined tolerance determined based on the practical application to which the classification model 126 is being applied. Thus, a classification model 126 being used for speech recognition can have a loss function that is minimized to a point where more historical data 128 may be forgotten (lower accuracy), than may be acceptable in a classification model 126 used for powerplant management or other mission critical applications (higher accuracy). Optimizing the loss function of a classification model 126 to narrower tolerances and increase classification accuracy can be accomplished by increasing the number of landmarks 132 being used in the training. The number and choice of landmarks 132 determines the accuracy of the updated classification model 126. Too few or non-representative landmarks 132 can lead to the updated classification model 126 forgetting information about the historical data 128. However, computational resources can increase, as well, in relation to the increase in landmarks 132. Thus, a balance between remembering more historical data 128 (minimizing the loss function) and available computational resources can be set by the predefined tolerance.

Figure 2:
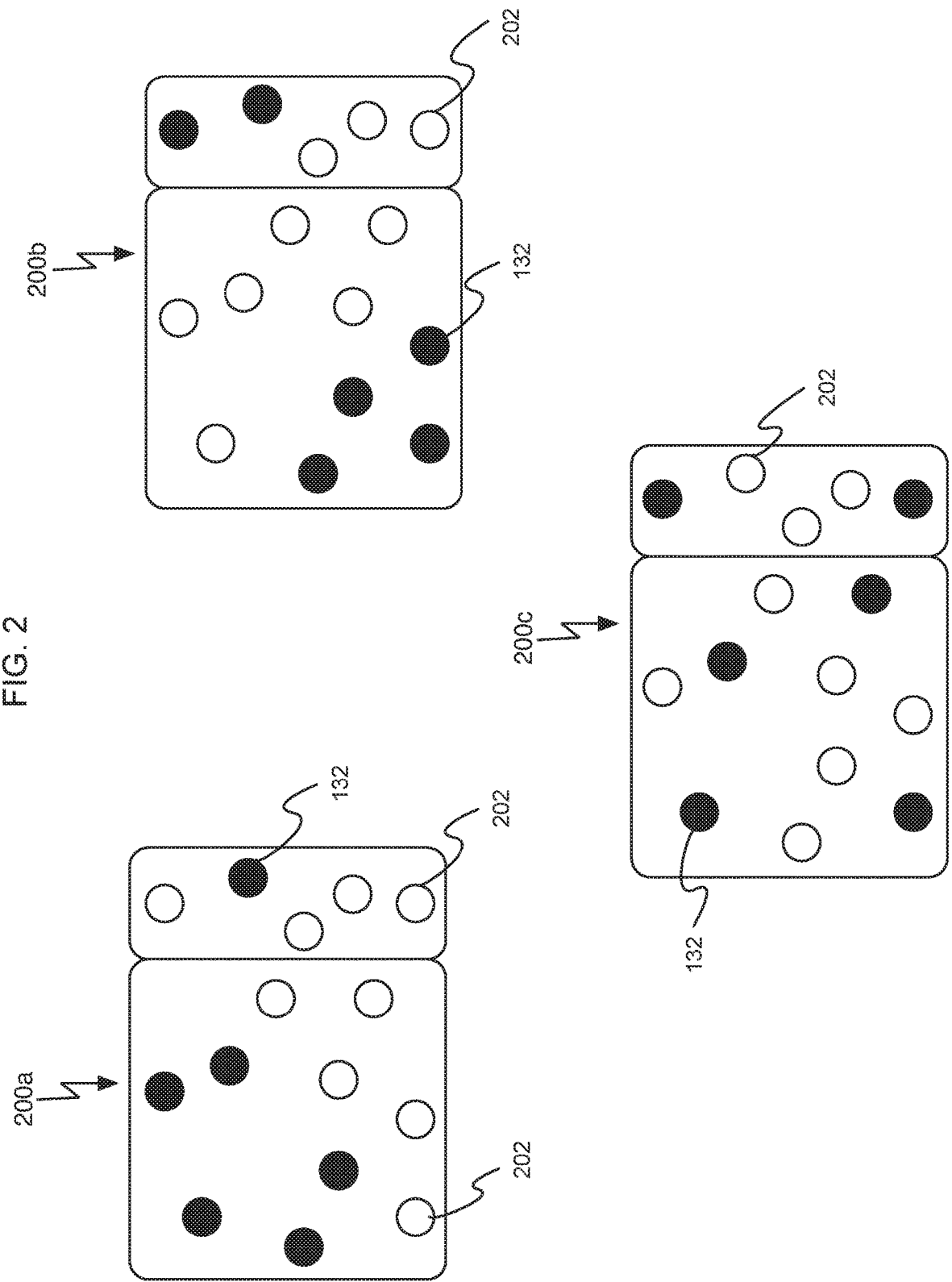
FIG. 2 is a block diagram illustrating landmark selection strategies in accordance with an embodiment of the present invention.

Embodiments of the present invention can use any appropriate strategies for selecting landmarks 132, for example, random, stratified, and distance based shown in FIG. 2. In the random strategy 200a shown in FIG. 2, data segments 202 are randomly selected as landmarks 132. Random landmarks 132 may not be representative of the historical data 128 and may lead to a classification model 126 that forgets too much of the historical data 128. Stratified sampling 200b selects landmarks 132 that cover all existing labels proportionally. A smart sampling 200c is a distance-based strategy that selects landmarks 132 according to the historical data 128 embedding distribution. More specifically, landmarks 132 can be iteratively selected such that at every step the probability of selecting a specific data segment 202 as a landmark 132 is proportional to its minimum squared distance to the already selected landmarks 132. In other words, the coverage of the landmark set 132 is maximized over the range of historical data 128.

In an embodiment, the existing classification model 126 is periodically refitted using new data 130 while at the same time attempting to minimize the error of the current classification model 126 on the historical data 128. Because it is difficult to train on the historical data 128 (e.g., it may be too large, or a significant portion may be unavailable), some embodiments select specific data points (e.g., landmarks 132), which serve as representatives of the historical data 128. The prediction error on the new data 130 as well as the difference between the landmark 132 errors on the new data 130 and historical data 128 can be minimized. In other words, some embodiments of the classification model 126 training, jointly seek to optimize the prediction performance of the new data 130 samples and maintain the prediction performance (as computed by the existing model) of the historic data 128 samples. Thus, given input data X, embodiments of the present invention find a low-dimensional representation, f(X) (e.g., embedding in a Euclidean space), of each data point such that similar data points have similar representations.

A classification model 126, in accordance with some embodiments of the present invention, can provide one or more of the following functions:

prediction: given labels for each data point in X and a new unlabeled data point x', predict the label of x' as the label of the data point x in X whose representation is closest to that of x';

retrieval: given no labels for any data and a new data point x', identify the historical data most similar to x' as those data points with representations most similar to that of x'; and anomaly detection: given no labels for any data and a new data point x', determine whether x' represents an anomaly when the difference between its representation and the representation of any of the historical data points exceeds a predetermined threshold.

Figure 3:
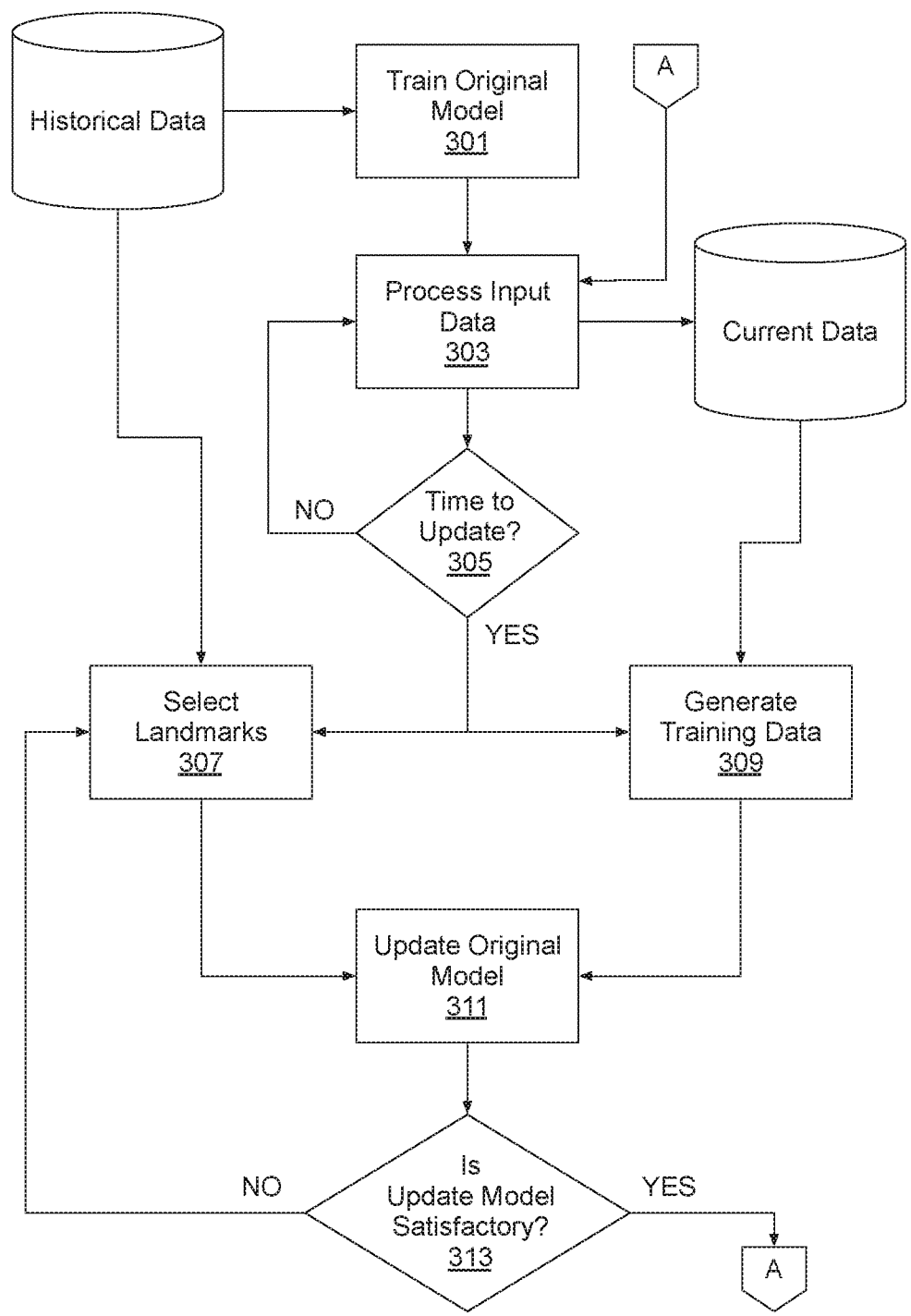
FIG. 3 is a flow diagram illustrating a method for updating a classification model using landmarks, in accordance with an embodiment of the present invention.

FIG. 3 illustrates a flow diagram in accordance with some embodiments of the present invention. The process shown in FIG. 3 starts at block 301, in which a classification model, such as the classification model 126 shown in FIG. 1, for example, is initially trained using training data, such as historical data 128 shown in FIG. 1. In normal usage, the original classification model 126 receives and processes input data at block 303. The input data can, in some embodiments, include time-series data received from a plurality of sensors monitoring, for example, operations of a power plant. In some embodiments, the input data can also include any sequence data, even when not annotated with time stamps. In other embodiments, the input data can be time-series acoustic data of speech used in a speech recognition or speech-to-text system.

However, at intervals, the process checks if the classification model 126 needs to be updated at block 305. In some embodiments, updates are set to occur at predefined time intervals. In other embodiments, the classification model is updated when classification accuracy of new input data falls below a set threshold. The accuracy threshold can be determined by a user based on the particular application to which the classification model 126 is applied. During intervals between updates, the classification model 126 continues to process input data at block 303. As the classification model 126 processes new input data at block 303, the process stores the input data as current data as well.

When the process determines, at block 305 that an update of the classification model is needed, the process proceeds to block 307. The process selects, as a set of landmarks 132, a limited number of data from a set of historical data 128 used to train the original classification model 126 at block 307. Additionally, the process generates training data from the stored current data 130 at block 309.

In some embodiments, 64 landmarks 132 can be selected from the set of historical data 128. In other embodiments, 128 landmarks 132 can be selected from the set of historical data 128. In still other embodiments, 256 landmarks 132 can be selected from the set of historical data 128. While embodiments of several different amounts of selected landmarks 132 are described herein, it is understood that the number of landmarks 132 being selected is not limited to just these examples. Rather, these amounts are intended as non-limiting examples; the number of landmarks 132 selected at block 307 can be any number of landmarks as appropriate for the particular application of the classification model 126. Thus, any number of landmarks 132 can be selected at block 307, where the number of selected landmarks 132 is significantly less than the total number of historical data segments 128.

Additionally, the landmark 132 selection at block 307 can, in some embodiments, rely on a random selection strategy, such as the random selection strategy 200a shown in FIG. 2. In other embodiments, block 307 can apply a stratified landmark 132 selection strategy, such as the stratified sampling 200b shown in FIG. 2. In still other embodiments, block 307 can apply a distance-based landmark 132 selection strategy, such as the smart sampling 200c shown in FIG. 2. The selection strategies employed at block 307 to select landmarks 132 can be any selection strategy that provides landmarks 132 that well represent the underlying historical data, preferably with the fewest number of landmarks 132.

The landmarks 132 selected at block 307 and the training data generated at block 309 are used, at block 311, to update the classification model 126 to obtain an updated classification model 126 having a loss function configured to capture similarities in the new training data and remember similarities in the historical data 128 represented by the set of landmarks 132 within a predefined tolerance. In some embodiments the label names and the number of labels remain the same after the update as where present in the original classification model. Thus, the labels in the current data are the same as the labels in the historical data, just the distribution of the data in each label can change.

In some embodiments the loss function applied at block 311 can be the total loss function in which the new data loss component is a triplet loss function and includes the novel landmark loss component, as expressed in Eq. 1-3. In other embodiments, the new data loss component of the total loss function can be other loss functions, such as pairwise loss. In contrast to triplet loss, which uses three examples—two of the same class and the third of another class, pairwise loss optimization minimizes the distance between the embeddings of two examples in the same class. In some embodiments, the current data 130 is learned by the classification model using a same loss function as used to originally train the classification model 126 on the historical data 128. Other embodiments can apply a different loss function for learning the current data 130 than the original loss function used to train the classification model 126. However, using a different new data loss function can introduce inconsistencies in the classification model. Thus, when deviating from the loss function originally used, care should be taken to compensate for any such inconsistencies.

The process checks, at block 313, if the updated classification model 126 has a loss function (as shown, for example, in Eq. 1-3) that satisfactorily capture similarities in the new training data and remembers similarities in the historical data 128. If the updated classification model does not satisfy the above constraints, the process returns to block 307 and selects a new set of landmarks 132.

The new set of landmarks 132 are used at block 311 along with the training data generated at block 309 to update the classification model 126. This loop, between blocks 307 to 313, continues until the loss function captures similarities in the new training data and remembers similarities in the historical data 128. Once the loss function satisfies the constraints, the process proceeds to block 303 and continues processing input data as described above. At this point, some embodiments can move the data held in the current data 130 store to historical data 128, and stores new data in the current data 130 store. In other embodiments, historical data 128 and current data 130 can be determined based on a timestamp attached to each data segment. Historical data 128 can, thus, be considered any data that predates the most recent update of the classification model 126, while current data can be considered any data that is received after the most recent update of the classification model 126.

Figure 4:
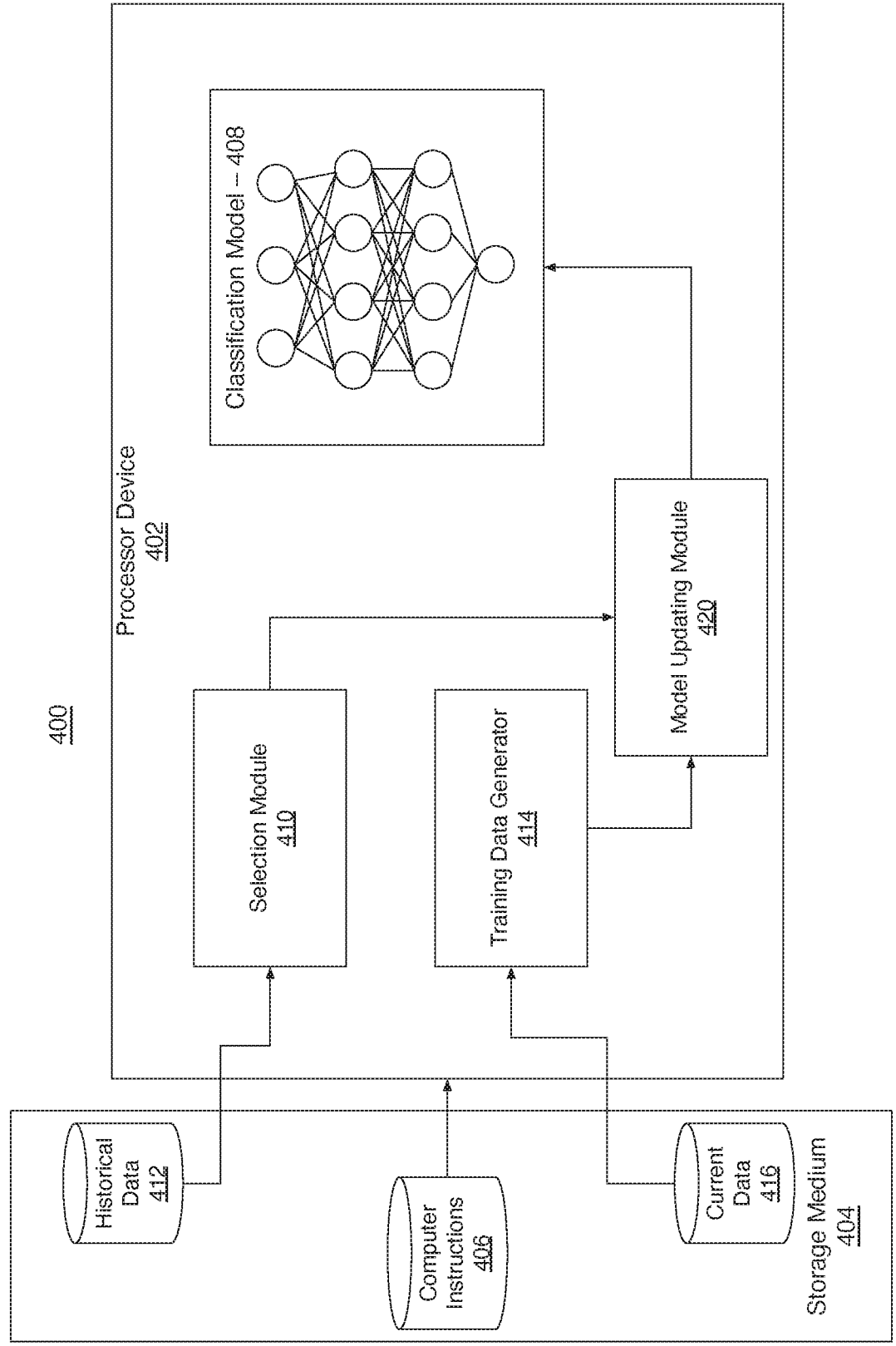
FIG. 4 is a block representation of a neural network system for updating a classification model using landmarks, in accordance with an embodiment of the present invention.

In some embodiments, a neural network system 400, as shown in FIG. 4, is provided. The neural network system 400 can included a processor device 402 and a computer readable storage medium 404. The storage medium 404 stores one or more computer executable instructions 406 that when executed by the processor device 402 implements a classification model 408. Additionally, the processor device 402 implements a selection module 410, a training data generator and a model updating module 420 based on computer executable instructions 406 stored in the storage medium 404. In some embodiments, the processor device 402 can be a field programmable gate array (FPGA) having logic gates particularly configured to function as one or more of the classification model 408, selection module 410, a training data generator and a model updating module 420. In other embodiments, the classification model 408, selection module 410, a training data generator and a model updating module 420 can be implemented as computer instructions executed by one or more processor devices 402 such as a central processing unit (CPU), or graphics processing unit (GPU), for example.

In an embodiment the selection module 410 can be, in some embodiments, configured to apply a distance-based landmark selection process using the embedding distribution historical data 128. The landmarks 132 can be iteratively selected such that at every step the probability of selecting a specific data segment as a landmark 132 is proportional to its minimum squared distance to the already selected landmarks 132, such that the coverage of the landmark set 132 is maximized over the range of historical data 128. For example, each new landmark 132 can be selected to have a maximum distance between itself and the previously selected landmarks 132. Thus, a first landmark 132 can be randomly selected from the set of historical data 128. Followed by a second selection iteration where a second landmark 132 is selected that has a maximum distance from the first landmark 132 in the Euclidean space in which the historical data is represented. In subsequent iterations of the landmark 132 selection, each new landmark 132 is selected based on the measured distance between the new landmark 132 and each of the previously selected landmarks 132 (e.g., the first landmark 132 and the second landmark 132). As a result, the final group of landmarks 132 can be assumed to be at a maximum distance from one another in the Euclidean space. As the number of landmarks 132 increases, the maximum distance between each landmark is reduced.

In another embodiment, rather than measure distances between landmarks 132, the Euclidean space representing the historical data 128 can be overlaid with a grid having a number of grid spaces equal to the number of landmarks 132 to be selected. In this embodiment a landmark 132 is selected from the one or more historical data enclosed in each grid space.

Figure 5:
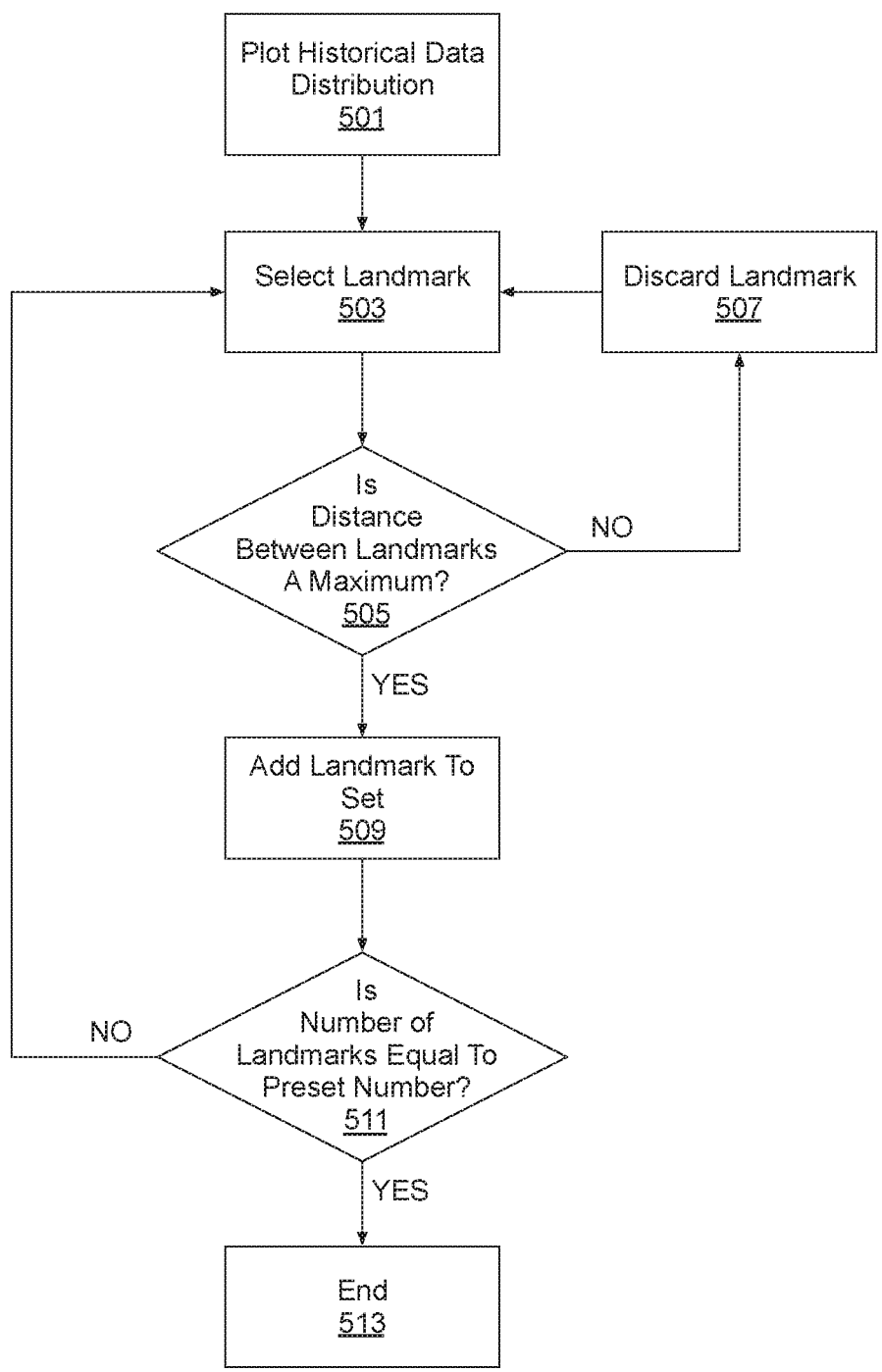
FIG. 5 is a flow diagram illustrating a method for selecting landmarks, in accordance with embodiments of the present invention.

An embodiment of a process performed by the selection module 410 is shown in FIG. 5. Turning to FIG. 5, an embodiment of the landmark selection process of the selection module 410 begins at block 501 where the distribution of the historical data 128 is plotted. From the historical data 128 a new landmark 132 is selected at block 503. The distance between the newly selected landmark 132 and previously selected landmarks 132 is calculated at block 505 to determine if the newly selected landmark 132 is at a maximum distance from the previously selected landmarks 132. If the newly selected landmark 132 is not at a maximum distance from the previously selected landmarks 132, the newly selected landmark 132 is discarded at block 507 and another landmark is selected at block 503. On the other hand, if the newly selected landmark 132 is at a maximum distance from the previously selected landmarks 132, the process continues block 509 where the newly selected landmark 132 is added to the set of landmarks 132.

The selection module 410 checks if the number of landmarks 132 added to the set of landmarks 132 equals a predetermined number of landmarks 132 at block 511. Once the number of selected landmarks 132 equals the predetermined number of landmarks 132, the process ends at block 513. However, until the predetermined number of landmarks 132 have been selected and added to the set of landmarks 132, the process loops from block 511 to block 503, where another landmark 132 is selected from the historical data 128. The process continues from block 503 as described above.

Returning to FIG. 4, the training data generator 414 retrieves the current data 416 (such as the current data 130 shown in FIG. 1) stored in the computer readable storage medium 404 to generate data for training the classification model 408 to learn new data represented by the current data 416. The model updating module 420 applies the set of landmarks 132 selected by the selection module 410 and the training data generated by the training data generator 414 to the classification model 408 to update the classification model 408. A process executed by the module updating module, in some embodiments, is shown in FIG. 3, namely blocks 305 through 313.

Figure 6:
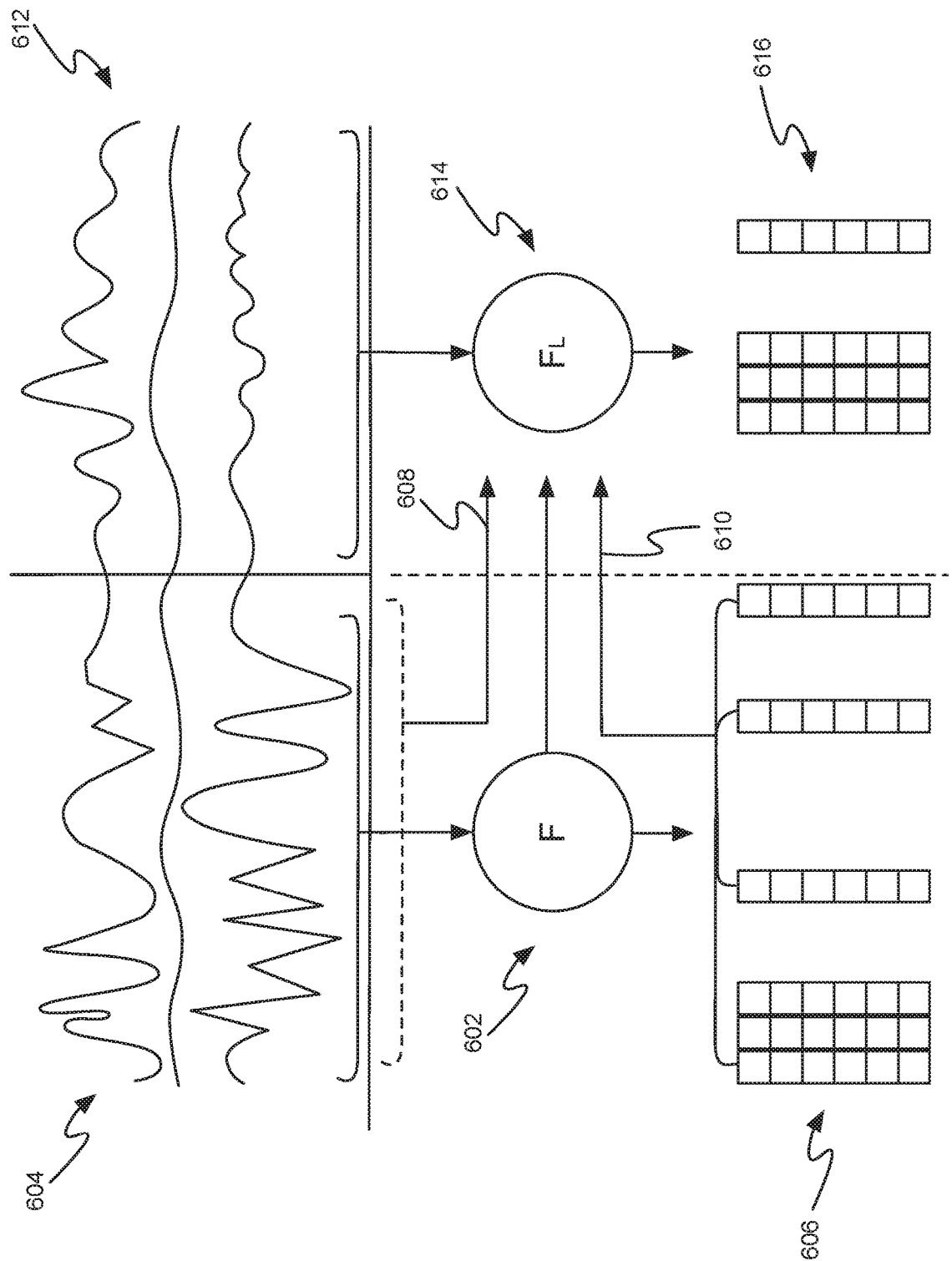
FIG. 6 is a block representation of an embodiment of the present invention.

Referring to FIG. 6, an embodiment of the present invention is shown. A classification model 602 receives time-series data as input data 604. The classification model 602 generates data representations 606 for the input data 604. As noted above, over time, the classification model 602 becomes less accurate at classifying the input data 604. Thus, at intervals, the classification model 602 is updated to an updated classification model 614. Embodiments of the present invention update the classification model 602 by selecting landmarks 608 from the historical data (e.g., input data 604) and the landmark representations 610 from the data representations 606. The number of landmarks 608 selected can be significantly less than the number of historical data. Additionally, new input data 612 is provided as training data to the classification model 602. Hence the landmarks 608 and their representations 610 in combination with the training data 612 updates the classification model 602 to the updated classification model 614. The updated classification model 614 generates accurate representations 616 of the new input data 612 and preserves as much as possible of the previously learned representations for the old input data 606.

Figure 7:
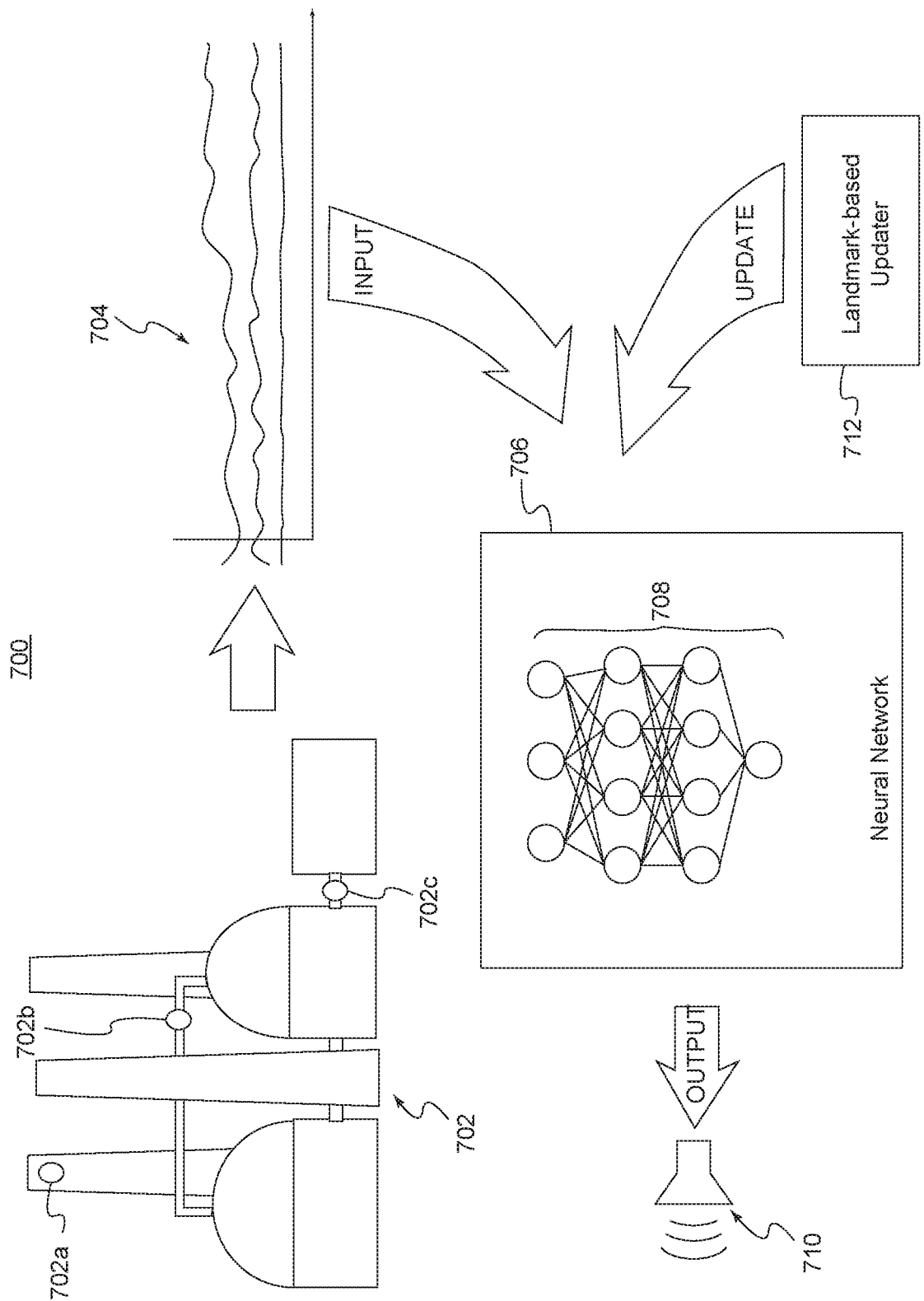
FIG. 7 is a representation of an application, in accordance with an embodiment of the present invention.

Referring to FIG. 7, an embodiment of the present invention incorporated into a powerplant management system 700 is shown. A monitored 702, such as the powerplant represented in FIG. 7, is equipped with multiple sensors (e.g., sensor 702a, sensor 702b and sensor 702c). Each sensor 702a, 702b, 702c generates time-series data 704 that is received by a neural network 706, including a classification model 708, where the time-series data 704 from the sensors 702a, 702b, 702c can be fed through the classification model 708 trained to classify the time series data 704. In some embodiments, the time-series data 704 can be classified into a plurality of categories, such as normal state, warning state, alarm state and anomaly state, for example. The system 700 can include an alert system 710 that can issue an alert, notification or alarm, as appropriate, when one of a warning, alarm or anomaly state is identified based on the classification of the time-series data 704 by the classification model 708.

The monitored system 702 can be any type of system that can be provided with sensors 702a, 702b, 702c configured to monitor relevant operational parameters. While, the system 702 is described herein as a powerplant management system, in other embodiments, the managed system 702 can be, for example, a waste treatment plant, a refinery, automated factory, multiple computer and/or Internet of Things (IoT) devices coupled to a network, etc.

A sensor 702a, 702b, 702c as understood in embodiments of the present invention can include any hardware or software component that can monitor and output time series data 704 regarding an operational parameter of a monitored system 702. The time series data 704 generated by the sensors 702a, 702b, 702c can be analog, digital or a combination of analog and digital signals.

The time series data 704 from the multiple sensors 702a, 702b, 702c can be provided to the classification model 708 via a wired or wireless communication path. For example, the sensors 702a, 702b, 702c can be equipped with transmitters conforming to any of the IEEE 802 network protocols (e.g., Ethernet or Wi-Fi), Bluetooth, RS-232, etc. Alternatively, the sensors 702a, 702b, 702c can be configured to transmit data via one or more proprietary data protocols.

In the case of a powerplant, for example, sensors 702a, 702b, 702c can be configured to monitor generator output, fuel feed pressure, etc., and provide timeseries data 704 relating the status of the equipment, such that the classification model 708 can determine whether the equipment is operating within normal parameters or is operating in a manner that is indicative of a problem.

In a speech recognition embodiment, the monitored system 702 can be a mobile device, for example, equipped with a microphone or other audio input device functioning as a sensor 702a. Thus, the time series data 704 can be speech received from a user of the mobile device. The classification model 708, in this embodiment, can be configured to classify, e.g., identify, words in the time series data 704. The output, rather than being an alert system 710, can be a speaker for outputting spoken replies, a display outputting information, or other devices configured to perform some action responsive to the recognized speech.

However, as described above, over time the domain of the time-series data 704 from the sensors 702a, 702b, 702c can drift until the classification model 708 is no longer able to reliably classify the current time-series data 704. Thus, a landmark-based updating system 712, such as the systems shown in FIGS. 1 and 4, for example, can be implemented in the system 702 to update the classification model 708 in the manner described above with reference to FIGS. 3 and 5 so that the classification model 708 can accurately classify the current data 704 while still remembering the historical data.

Embodiments of the present invention have been evaluated using a number of different sources of data, e.g., synthetic, referred to, hereinafter, as syn and real world, referred to, hereinafter, as iot1 and iot2. In the evaluation, the real data is preprocessed to remove the sensors with discrete (e.g., on-off sensors), missing, or unchanging (e.g., values vary by less than about 0.1% from the average) values. All data is normalized to a mean of 0 and standard deviation of 1. For each data source, two data sets are considered, identified as old and new. The original mapping, FA, is learned on the old data, and then updated to FAB on the new data using embodiments of the present invention.

$Syn_{old}$ is generated using the sine function $f(t; \varphi) = \sin(\pi^* t = \varphi)$, where t denotes the time step and y the frequency of the sine wave. ten sensors are simulated: nine initialized with random values and the tenth with f for two different values of $\varphi$. The same label is assigned for series corresponding to the same $\varphi$. To generate $syn_{new}$ the process is repeated, but the values of $\varphi$ are changed.

$iot1_{old}$ represents several months-worth of readings from a small Internet of things (IoT) system (less than ten sensors) and contains four labels. To generate $iot1_{new}$, the original data is transformed using two different transformations: scaling and flipping around the mean. To scale, all sensor readings are multiplied by a fixed integer and added to another fixed integer. To flip around the mean, the mean of all the values in the data is computed, and the transformation $f(x) = x - 2^*(x - \mu)$ is applied thereto. All labels are maintained after transformation.

$Iot2_{old}$ is collected from a large IoT system with thousands of sensors for every minute over several months. To generate $iot2_{new}$, the same transformations are applied, as described above with respect to $iot1_{new}$.

Having a precise retrieval can provide accurate classification of the system states or detection of operation anomalies. Below retrieval precision of some embodiments of the present invention are evaluated for their ability to remember the old data and learn the new data. The mapping learned using the landmark-based training is evaluated for how accurately the new data is represented. In other words, the evaluation determines the accuracy with which test samples from the new data are classified. Also, the updated mapping is evaluated for the ability of the updated mapping to still remember the old data.

The accuracy can be measured when trying to classify test samples from the old data. The below results, shown in Table 1, present the evaluation of various embodiments of the present invention. The various embodiments evaluated represent landmark-based updating using different numbers of landmarks and different landmark selection strategies.

To understand the effectiveness of landmarks, the various embodiments are compared against a range of mapping update mechanisms. At the extreme ends of the spectrum, updating is not performed at all, either by keeping the mapping learned for the old data (DisregardNewData) or the old mapping is dropped altogether, and a new mapping is learned from scratch (ForgetOldData). The performance is also evaluated when the entire data is learned at the same time (AllData). Also considered is the case where the old mapping is the start point, but the old mapping continues to be updated on the new data without any landmarks (NoLandmark). This is different from the DisregardOldData case in that the parameters of the network are not randomly initialized.

The test data is selected from both the old and new parts of each of the data sources. Precision@K is measured for each test set, where K represents the nearest K segments in embedding space for any test segment. Table 1 shows the results for all data sets.

TABLE 1

Retrieval Precision

| | Remembering Old Data | | | Learning New Data | | |
|---|---|---|---|---|---|---|
| Syn | @1 | @10 | @100 | @1 | @10 | @100 |
| DisregardNewData | 0.93 | 0.92 | 0.92 | — | — | — |
| ForgetOldData | — | — | — | 0.49 | 0.48 | 0.48 |
| LandmarkRandom64 | 0.89 | 0.85 | 0.78 | 0.76 | 0.75 | 0.73 |
| LandmarkRandom128 | 0.86 | 0.93 | 0.91 | 0.75 | 0.76 | 0.76 |
| LandmarkRandom256 | 0.96 | 0.94 | 0.94 | 0.78 | 0.79 | 0.78 |
| LandmarkSmart64 | 0.88 | 0.87 | 0.80 | 0.76 | 0.75 | 0.73 |
| LandmarkStratified64 | 0.91 | 0.88 | 0.82 | 0.75 | 0.73 | 0.73 |
| AllData | 0.98 | 0.98 | 0.97 | 0.85 | 0.84 | 0.83 |
| NoLandmark | 0.76 | 0.66 | 0.55 | 0.69 | 0.70 | 0.69 |
| Iot1 (flip) | | | | | | |
| DisregardNewData | 1.00 | 0.99 | 0.99 | — | — | — |
| ForgetOldData | — | — | — | 1.00 | 0.99 | 0.99 |
| LandmarkRandom64 | 1.00 | 0.99 | 0.99 | 1.00 | 0.99 | 0.99 |
| LandmarkRandom128 | 1.00 | 0.99 | 0.99 | 1.00 | 0.99 | 0.99 |
| LandmarkRandom256 | 1.00 | 0.99 | 0.99 | 1.00 | 0.99 | 0.99 |
| LandmarkSmart64 | 1.00 | 0.99 | 0.99 | 1.00 | 0.99 | 0.99 |

TABLE 1-continued

| | Retrieval Precision | | | | | |
|---|---|---|---|---|---|---|
| | Remembering Old Data | | | Learning New Data | | |
| Syn | @1 | @10 | @100 | @1 | @10 | @100 |
| LandmarkStratified64 | 1.00 | 0.99 | 0.99 | 1.00 | 1.00 | 0.99 |
| AllData | 1.00 | 0.99 | 0.99 | 1.00 | 0.99 | 0.99 |
| NoLandmark | 1.00 | 0.99 | 0.99 | 1.00 | 0.99 | 0.99 |

In Table 1, above, the numbers following LandmarkRandom, LandmarkStratified and LandmarkSmart signify the number of landmarks selected to the individual embodiment being evaluated. Random, stratified and smart identify the landmark selection strategy used, as described above with respect to FIG. 2.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for updating a classification model of a neural network, comprising:
    selecting, as a set of landmarks, a limited number of data from a set of historical data used to train a classification model;
    generating new training data from recently collected data; and
    updating the classification model with the new training data and the set of landmarks to obtain an updated classification model having a loss function configured to capture similarities in the new training data and remember similarities in the historical data represented by the set of landmarks within a predefined tolerance, wherein a landmark component of the loss function (landmark$_{loss}$) for a data point (X) is determined as follows:

$$\text{landmark}_{loss}(X) = d(f_S(X), f_T(X)),$$

where d represents a Euclidean similarity distance d between a representation of the data point (X) in a historical mapping $f_s(X)$ and in a new mapping $f_T(X)$.

2. The method as in claim 1, wherein the landmark component of the loss function includes Euclidean distances between representations of each landmark of the set of landmarks in the classification model and the updated classification model.

3. The method as in claim 1, wherein selecting landmarks includes iteratively selecting landmarks.

4. The method as in claim 3, wherein at each iterative step a probability of selecting a particular data segment as a landmark of the set of landmarks is proportional to its minimum squared distance to landmarks selected in previous iterative steps.

5. The method as in claim 1, wherein the set of landmarks are divided into multiple subsets of landmarks, a different subset of landmarks being used for each epoch of the updating.

6. The method as in claim 1, wherein the set of landmarks is used for each epoch of the updating.

7. The method as in claim 1, wherein the classification model receives time series data from sensors deployed to monitor operations at a powerplant.

8. The method as in claim 1, wherein the classification model receives time series data from one or more microphones coupled to a speech recognition system.

9. A neural network system comprising:
    a non-transitory computer readable storage medium embodying computer readable instructions; and
    a processor device configured to implement a classification model based on the computer readable instructions, the processor further configured to update the classification model by implementing:
        a selection module configured to select, as a set of landmarks, a limited number of data from a set of historical data used to train the classification model; and
        a model updating module configured to update the classification model with new training data and the set of landmarks to obtain an updated classification model having a loss function configured to capture similarities in the new training data and remember similarities in the historical data represented by the set of landmarks within a predefined tolerance, wherein a landmark component of the loss function (landmark$_{loss}$) for a data point (X) is determined as follows:

$$\text{landmark}_{loss}(X) = d(f_S(X), f_T(X)),$$

where d represents a Euclidean similarity distance d between a representation of the data point (X) in a historical mapping $f_x(X)$ and in a new $f_T(X)$.

10. The neural network system as in claim 9, wherein the landmark component of the loss function includes Euclidean distances between representations of each landmark of the set of landmarks in the classification model and the updated classification model.

11. The neural network system as in claim 9, wherein the selection module includes iteratively selecting landmarks.

12. The neural network system as in claim 11, wherein at each iterative step a probability of selecting a particular data segment as a landmark of the set of landmarks is proportional to its minimum squared distance to landmarks selected in previous iterative steps.

13. The neural network system as in claim 9, wherein the set of landmarks are divided into multiple subsets of landmarks, a different subset of landmarks being used for each epoch of the update.

14. The neural network system as in claim 9, wherein the set of landmarks is used for each epoch of the update.

15. A non-transitory computer readable storage medium comprising a computer readable program for updating a classification model of a neural network, wherein the computer readable program when executed on a computer causes the computer to perform the method comprising:
    selecting, as a set of landmarks, a limited number of data from a set of historical data used to train a classification model;
    generating new training data from recently collected data; and
    updating the classification model with the new training data to obtain an updated classification model having a loss function configured to capture similarities in the new training data and remember similarities in the historical data represented by the set of landmarks within a predefined tolerance, wherein a landmark component of the loss function (landmark$_{loss}$) for a data point (X) is determined as follows:

$$\text{landmark}_{loss}(X) = d(f_S(X), f_T(X)),$$

where d represents a :Euclidean similarity distance d between a representation of the data point (X) in a historical mapping $f_s(X)$ and in a new mapning $f_T(X)$.

16. The non-transitory computer readable storage medium as in claim 15, wherein the landmark component of the loss function includes Euclidean distances between representations of each landmark of the set of landmarks in the classification model and the updated classification model.

17. The non-transitory computer readable storage medium as in claim 15, wherein selecting landmarks includes iteratively selecting landmarks.

18. The non-transitory computer readable storage medium as in claim 17, wherein at each iterative step a probability of selecting a particular data segment as a landmark of the set of landmarks is proportional to its minimum squared distance to landmarks selected in previous iterative steps.

19. The non-transitory computer readable storage medium as in claim 15, wherein the set of landmarks are divided into multiple subsets of landmarks, a different subset of landmarks being used for each epoch of the updating.

20. The non-transitory computer readable storage medium as in claim 15, wherein the set of landmarks is used for each epoch of the updating.

\* \* \* \* \*